United States Patent [19]

Fischer et al.

[11] 4,379,622
[45] Apr. 12, 1983

[54] BROAD BAND PHASE SHIFT SYSTEM

[75] Inventors: Dennis G. Fischer, Mountain View; Arnold L. Bloom, Menlo Park, both of Calif.

[73] Assignee: Coherent, Inc., Palo Alto, Calif.

[21] Appl. No.: 193,240

[22] Filed: Oct. 2, 1980

[51] Int. Cl.³ .................. G02B 5/30; G02B 27/28
[52] U.S. Cl. ..................... 350/394; 350/395
[58] Field of Search .............. 350/394, 395, 400

[56] References Cited

PUBLICATIONS

W. H. Southwell, "Multilayer Coding Design Achieving A Broadband 90° Phase Shift," *Applied Optics,* vol. 19, p. 2688 (1980).
W. H. Southwell, "Multilayer Codings Producing 90° Phase Change," *Applied Optics,* vol. 18, p. 1875 (1979).
M. L. Scott, "Analysis of Phase Retardation Codings,"- *Journal of Optical Society of America,* vol. 69, p. 1437 (1979).
Southwell, W. H., "Multilayer High Reflective Coating Designs Achieving Broadband 90° Phase Change," *SPIE* vol. 190, LASL Optics Conference (1979), pp. 81–88.

*Primary Examiner*—R. A. Rosenberger
*Attorney, Agent, or Firm*—Limbach, Limbach & Sutton

[57] ABSTRACT

A broad band phase shifting system, having a fixed angle of phase retardation, has at least one broad band reflecting means in the system. The broad band reflecting means also has an angle of phase retardation, with the angle of phase retardation of the reflecting means less than the fixed angle of phase retardation of the system.

2 Claims, 5 Drawing Figures

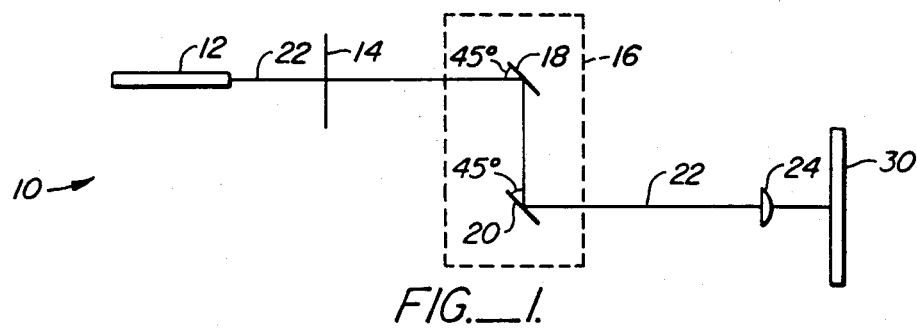
FIG._1.
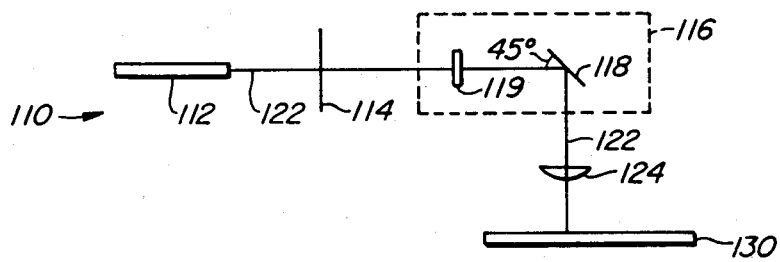
FIG._2.
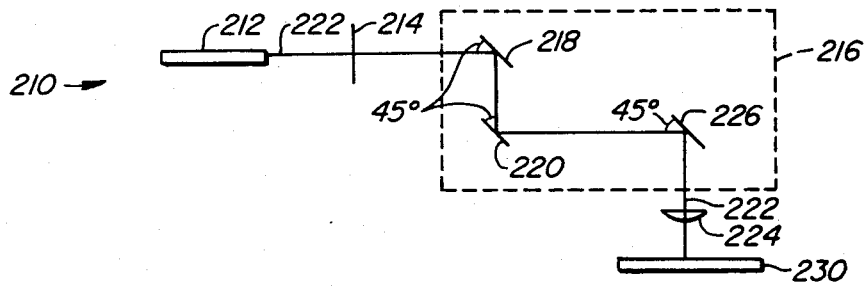
FIG._3.
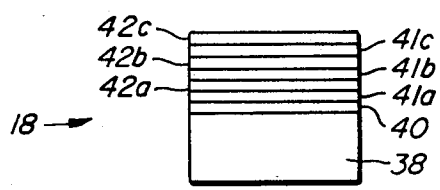
FIG._4.
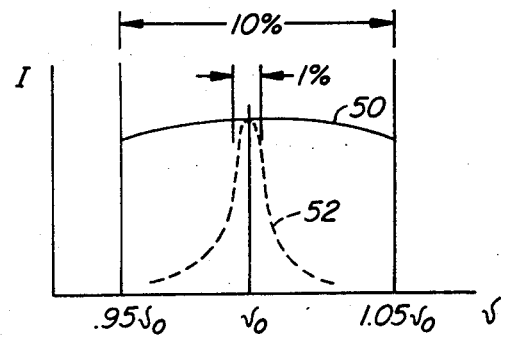
FIG._5.

BROAD BAND PHASE SHIFT SYSTEM

BACKGROUND OF THE INVENTION

The present invention relates to a broad band phase shift system, and more particularly to a broad band system using reflective means.

Phase shift systems are well known in the art. They are in general characterized by axes of principal polarizations and an angle of phase shift or retardation angle associated with these axes. They may be of two types: transmissive or reflective. One example of a transmissive phase shift system is a common quarter-wave quartz plate. In the quarter-wave quartz plate, electromagnetic radiation impinging on the plate will be transmitted therethrough. However, a 90° phase retardation would occur between the principal polarizations. By broad band phase shift system it is meant that the same degree of phase retardation would occur over a wide range of frequency of incident beam. Thus, a 90° broad band transmissive phase shifter would retard the phase by 90° between the principal polarizations for a wide range of incident electromagnetic beams having differing frequencies.

A quartz plate, however, is not a broad band phase shifter. Typically, a ten percent (10%) bandwidth phase shifter, i.e. a phase shifter operative over the range of $V \pm 0.05$ V (where V is frequency), is considered broad band.

Reflective phase shifters are also known in the art. In *Applied Optics*, Volume 19, page 2688 (1980), and Volume 18, page 1875 (1979), the author Southwell describes a reflective phase shifter using multi-layer dielectric material. Similarly, in *Journal of Optical Society of America*, Volume 69, page 1437 (1979), M. L. Scott also describes a 90° reflective phase shifter, constructed of dielectric multi-layer coatings. However, in both Scott and Southwell (1979) articles, the reflective phase retarder constructed was of narrow bandwidth.

SUMMARY OF THE INVENTION

In accordance with the apparatus of the present invention, a broad band phase shift system having a fixed angle of phase retardation has a broad band reflecting means. The reflecting means has an angle of phase retardation less than the fixed angle of the system.

BRIEF DESCRIPTION OF THE DRAWINGS

FIG. 1 is a schematic side view of a laser system using one embodiment of the apparatus of the present invention.

FIG. 2 is a schematic side view of another laser system using another embodiment of the apparatus of the present invention.

FIG. 3 is a schematic view of yet another laser system using yet another embodiment of the apparatus of the present invention.

FIG. 4 is an enlarged schematic side view of one component, a reflector having a phase shift, of the apparatus of the present invention.

FIG. 5 are graphs of frequency versus intensity of the electromagnetic beam incident on the reflecting means in the apparatus of the present invention, and the reflecting means of the prior art.

DETAILED DESCRIPTION OF THE INVENTION

Referring to FIG. 1, there is shown a broad band phase shift system 16 of the present invention used in a laser system 10. The system 10 comprises a laser 12, such as a $CO_2$ laser, capable of generating a high power beam of electromagnetic coherent radiation of at least 20 watts at 10.6 microns. The beam is aligned to traverse along path 22. A linear polarizer 14 linearly polarizes the beam. The path 22 then enters into the phase shift system 16 of the present invention. The phase shift system 16 comprises a first reflecting means 18 and a second reflecting means 20. The beam travels along the path 22 and is aligned to impinge the first reflecting means 18 at forty-five degrees (45°) from the normal to reflect therefrom, to impinge the second reflector means 20 also at forty-five degrees (45°) from the normal and to reflect therefrom. From the phase shift system 16 the beam travels along path 22 and is focused by the focusing means 24, which is simply a focusing lens. The focusing means 24 focuses the beam onto a target 30, which typically is of a rigid material, such as stainless steel or ceramics. The action of the incident beam causes thermal reaction with the material, producing holes or apertures therein.

The phase shift system 16 is exactly analogous to a transmissive quarter-wave plate. The phase shift system 16 causes a total angle of phase retardation of substantially 90°. Having the properties of a transmissive quarter-wave plate, the phase shift system 16 converts the linearly polarized beam from the linear polarizer 14 into a circularly polarized beam. In FIG. 1 the phase shift system 16 is comprised of two identical reflecting means, 18 and 20 respectively, each having an angle of phase retardation of substantially 45°. The particular physical characteristics of the first or second reflecting means 18 or 20 respectively will be described hereinafter.

Referring to FIG. 2, there is shown another embodiment of the phase shift system 116 of the present invention. The phase shift system 116 is used in a laser system 110 which is exactly the same as the laser system 10 of FIG. 1. Similar to the components previously described, the laser system 110 comprises a $CO_2$ laser 112 emitting a beam of electromagnetic coherent radiation aligned to traverse along path 122 through a linear polarizing means 114 which has a direction of polarization. The linearly polarized beam passes through the phase shift system 116 and is converted into a circularly polarized beam by the phase shift system 116. The beam is then focused by focusing means 124 to impinge the target 130.

The phase shift system 116 of FIG. 2 has the same general characteristics as the phase shift system 16 of FIG. 1; namely, the system 116 has a total angle of phase retardation of substantially 90°. The phase shift system 116 of FIG. 2 comprises a transmissive plate 119 and a reflecting means 118. The reflector 118 is similar to the first reflecting means 18 shown in FIG. 1. The transmissive plate is similar in characteristics to the reflecting means 118 in that it has an angle of phase retardation of substantially 45°. The transmissive plate 119 is in essence a one-eighth wave plate. The beam travels along path 122 passing through transmissive plate 119 in a direction substantially parallel to the normal to the surface of the plate 119. From the plate 119, the beam is incident onto the reflecting means 118 at substantially forty-five degrees from the normal to the surface and is reflected therefrom.

Referring to FIG. 3, there is shown yet another embodiment of the phase shift system 216 of the present system. The phase shift system 216 is used in a laser system 210, which is exactly the same as the laser 110 of FIG. 2 or the laser system 10 of FIG. 1. In this embodiment, the phase shift system 216 comprises a first, second and third reflecting means, 218, 220 and 226 respectively. Each of the first, second and third reflecting means, 218, 220 and 226 respectively, has an angle of phase retardation. The sum of the angle retardation of each of the first, second and third reflecting means 218, 220 and 226 respectively is substantially 90°.

Referring to FIG. 4, there is shown a reflecting means 18 used in the phase shift system 16, 116 or 216 of the present invention. The reflecting means 18 comprises a substrate 40. A plurality of first dielectric material, 41a, 41b and 41c and a plurality of second dielectric material 42a, 42b and 42c are on substrate 40. The first and second dielectric materials, 41 and 42 respectively, are different with the first and second dielectric materials 41 and 42 on the substrate 40 in alternate layers. Typically, the substrate 40 is made from any highly reflecting metal, such as silver or aluminum. The first dielectric material 41 may be any material having a high refractive index, such as Ge or TiO$_2$. The second dielectric material 42 may be any material having low refractive index, such as SiO$_2$, ZnS or ThF$_4$.

Typically, the substrate 40, the first dielectric material 41 and the second dielectric material 42 are on the order of 1 micron or less in thickness. Thus, for physical support, the reflecting means 18 is usually placed on a bulk 38. One method of manufacturing the reflecting means 18 is by evaporating the substrate 40, such as silver film onto the bulk 38. Thereafter, the first and second dielectric material 41 and 42 are evaporated alternatingly onto the silver substrate 40.

One specific embodiment of a broad band reflecting means having an angle of retardation of about 45° is made of the following layers:

| Material | Thickness (in microns) |
|---|---|
| (1) | .2097 |
| (2) | .9099 |
| (1) | 1.1735 |
| (2) | .8776 |
| (1) | .7308 |
| (2) | .6818 |
| (1) | .6769 |
| (2) | .9021 |
| (1) | 1.2384 |
| (2) | 1.2356 |
| (1) | 1.2692 |
| (2) | 1.2544 |
| (1) | 1.0382 |
| (2) | 1.0456 |
| (1) | .9985 |
| (2) | .6944 |
| (1) | .2904 |
| S | 1.0000 | on a bulk for support where
 S=silver
 (1)=ZnS or TiO$_2$
 (2)=ThF$_4$ or SiO$_2$
with bandwidth of about 10%.
Of course, other reflecting means having differing degrees of phase retardation, including zero degree, may be achieved through the use of different materials for the layers, different number of layers, different thickness of the layers or combination thereof.

Referring to FIG. 5, there is shown a graph of intensity versus frequency of reflected beam, showing the broad band nature of the reflecting means 18 of the phase shift system of the present system. Curve 50 shows the broad band response of the reflecting means in the system of the present invention, whereas curve 52 shows the narrow band response of the reflecting phase shifter of the prior art.

There are many advantages to the phase shift system of the present invention. First, the system is broad band. Unlike the reflective phase shifters as disclosed by Southwell (1979), the phase shift system of the present invention employing broad band reflective phase shifters may be employed for a variety of purposes using lasers or other electromagnetic radiation sources having differing frequencies. Secondly, because the phase shifter is broad band, there is much greater manufacturing tolerance in optical thickness and determination of the centering wave length, during the evaporation of the dielectric layers. Thirdly, in high power laser beam applications, requiring low optical absorption in the dielectric layers, a single phase shifter to retard a large angle, such as ninety degrees, may not be attainable. The use of a plurality of phase shifters, each retarding a small angle such that the sum of the angles of retardation is ninety degrees is achievable. Finally, because each individual phase shifter will absorb less power, the total beam power throughput in the system will increase.

What is claimed is:

1. A broad band phase shift system having phase retardation of substantially ninety degrees comprising:
    two substantially identical reflecting means, each having an angle of phase retardation of substantially forty-five degrees;
    each reflecting means comprising:
        a substrate of a material having high reflectivity;
        a plurality of first dielectric material having low refractive index;
        a plurality of second dielectric material having high refractive index; and
        said first and second dielectric materials on said substrate in alternate layers.

2. The system of claim 1, wherein said reflecting means is constructed substantially in accordance with the following dimensions and materials:

| Material | Thickness (in microns) |
|---|---|
| (1) | .2097 |
| (2) | .9099 |
| (1) | 1.1735 |
| (2) | .8776 |
| (1) | .7308 |
| (2) | .6818 |
| (1) | .6769 |
| (2) | .9021 |
| (1) | 1.2384 |
| (2) | 1.2356 |
| (1) | 1.2692 |
| (2) | 1.2544 |
| (1) | 1.0382 |
| (2) | 1.0456 |
| (1) | .9985 |
| (2) | .6944 |
| (1) | .2904 |
| S | 1.0000 | on a bulk for support where
 S=silver
 (1)=ZnS or TiO$_2$
 (2)=ThF$_4$ or SiO$_2$.

* * * * *